Oct. 17, 1933.  M. J-B. BARBAROU  1,930,549
SERVO BRAKE
Filed Jan. 13, 1932  3 Sheets-Sheet 1
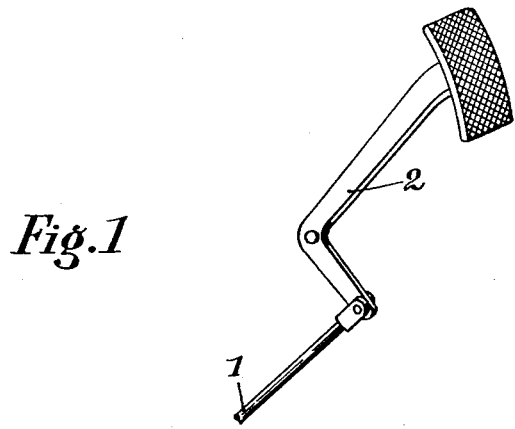
*Fig.1*
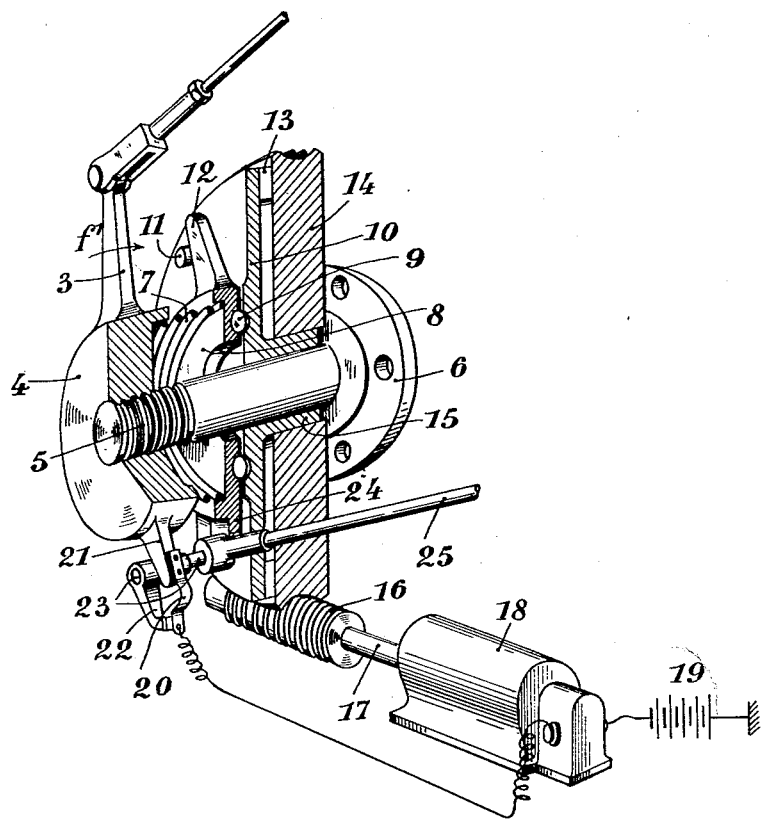
Marius Jean-Baptiste Barbarou
INVENTOR Oct. 17, 1933.  M. J.-B. BARBAROU  1,930,549
SERVO BRAKE
Filed Jan. 13, 1932  3 Sheets-Sheet 2
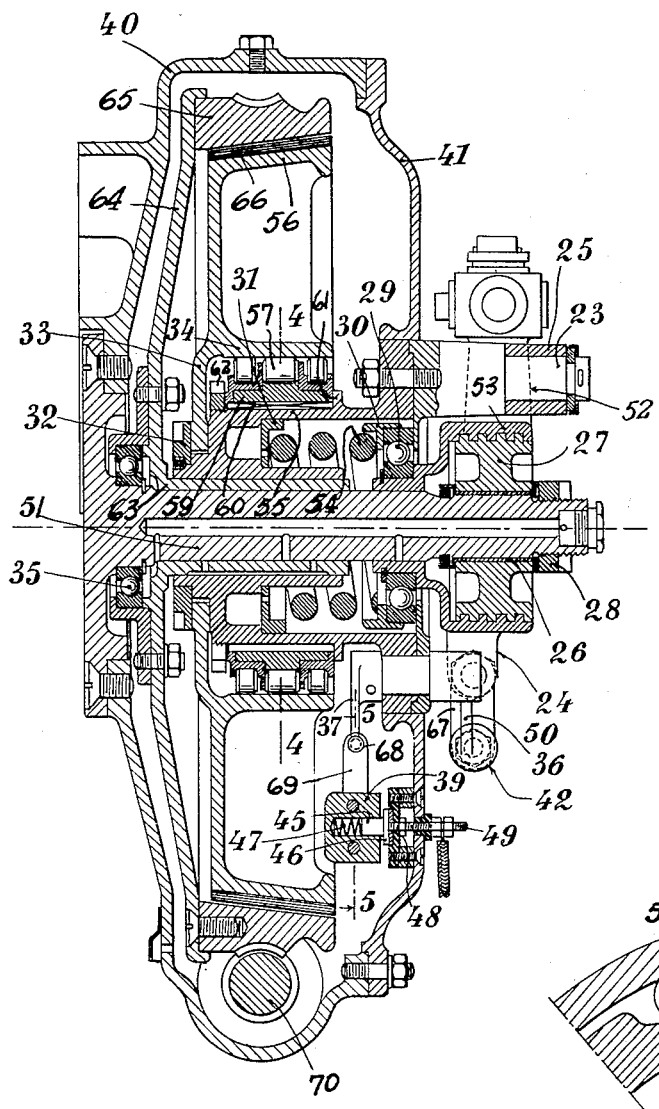
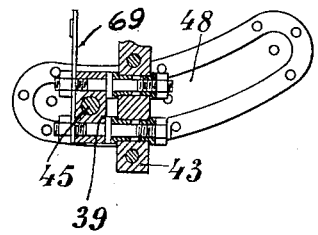
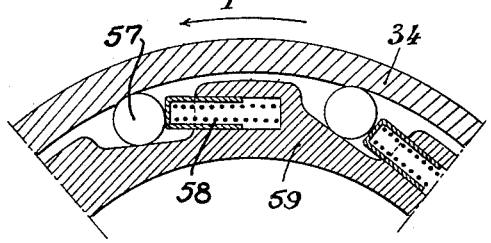
Marius Jean-Baptiste Barbarou
INVENTOR
his Attorney.

Oct. 17, 1933.   M. J-B. BARBAROU   1,930,549
SERVO BRAKE
Filed Jan. 13, 1932   3 Sheets-Sheet 3

Marius Jean-Baptiste Barbarou
INVENTOR

Patented Oct. 17, 1933

1,930,549

UNITED STATES PATENT OFFICE 1,930,549

SERVO-BRAKE

Marius Jean-Baptiste Barbarou, Neuilly-sur-Seine, France

Application January 13, 1932, Serial No. 586,296, and in France January 30, 1931

4 Claims. (Cl. 188—156)

The invention relates to servo-brakes, in which an auxiliary prime mover, controlled by the depression of the brake-pedal or lever, supplies the necessary braking power.

Numerous types of servo-brakes are in use upon motor vehicles or the like, but most of such devices require frequent adjustments; furthermore, the driver has not the feeling that the braking effect is proportional to the stress he exercises upon the pedal or other controlling means.

The present invention has for its object to devise an electro-mechanical servo-brake which will preserve a substantially constant adjustment and in which the braking effect is substantially proportional to the stroke of the brake pedal or the like.

Another object of the invention is to provide a servo-brake of the type above mentioned in which the supply circuit of the electric motor is so arranged with respect to the servo-brake that this circuit will be closed only during the very brief periods in which the brakes are applied or in which the intensity of the braking action is to be increased.

In a preferred form of construction, the servo-brake comprises in combination an electric motor, a clutch mounted between the motor and a brake-actuating member connected with the brake, and a clutch actuating member which is connected with the control-pedal or lever and which is adapted on the one hand to close the motor circuit when moved away from the idle position, and on the other hand to apply the clutch with a pressure which is proportional to the stroke of the pedal or lever.

Further characteristics and advantages will be specified in the following description:

In the accompanying drawings, which are given merely by way of example:

Fig. 1 is a diagrammatic perspective view of a device in conformity to the invention;

Fig. 2 is a lengthwise section on the line 2—2 of Fig. 3, of a form of construction;

Fig. 4 is a partial section on the line 4—4 of Fig. 2;

Fig. 5 is a section, on line 5—5 of Fig. 2, of the device for leading the current to the switch of the motor.

Figure 3:
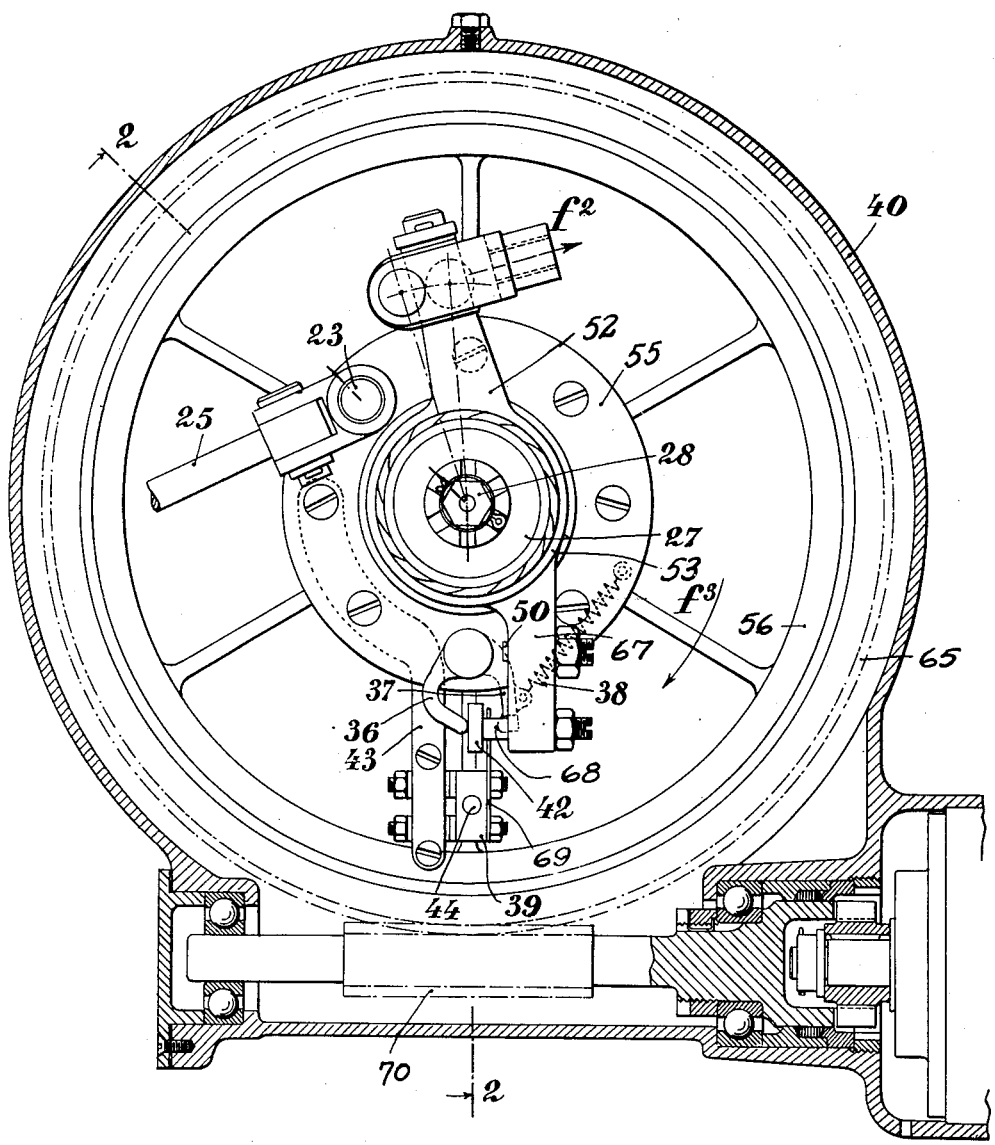
Fig. 3 is a front view, with parts broken away and the cover of the casing being removed, showing the position of the controlling levers and the operation device with a worm gearing between the motor and clutch.

In the form of construction represented in Fig. 1, an operating rod 1 is secured to the controlling pedal (or lever) 2 and is pivoted to a lever 3, which is secured to a disc 4 adapted to oscillate while screwing or unscrewing upon a threaded axle 5 mounted on the vehicle frame 6 by means of a plate 6.

A spring 7 bears, by one end, upon the disc 4 of the lever 3 and, by the other end upon a spring plate 8 which is adapted to rest—by means of a thrust bearing 9—upon a disc 10 which is loose upon a smooth journal of the axle 5. The disc 10 carries a stud or stop 11 which may come into contact with an arm 12 mounted on the concave disc 8. Said disc forms part of an uncoupling device which is further provided with a friction facing 13 and a worm-wheel 14, which is loose upon the axle 5 or on a hub 15 of the disc 10.

The wheel 14 engages a worm 16 which is rotated by the shaft 17 of an electric motor 18.

The supply circuit of this motor comprises a source of current 19, and a switch device whereof one contact-piece is mounted on a spring strip 20 secured to an arm 21 integral with the disc 4 of the lever 3, and the other contact-piece is mounted on a lever 22 keyed to an axle 23, mounted on a boss 24 of the spring plate 8. A rod 25, co-operating with the arm 21 of the disc 4 (or with any other axle mounted on the spring plate 8) is pivoted to the axle 23, and the said rod connects the servo-brake with the braking mechanism, such as a lever, cam or the like, not shown.

The operation of the said apparatus is as follows: The driver presses down his controlling pedal or lever 2 in order to apply the brakes, and thus turns the lever 3 in the direction of the arrow $f^1$. As the disc 4 of this lever is threaded, the helical rotation of said hub 4 will compress the spring 7. This latter, by means of the spring plate 8, transmits the stress to the coupling disc 10 which is thus applied against the worm-wheel 14 and is connected in rotation with said wheel by means of the facing 13. However, at the same time, the lever 3 when rotating has closed the electric circuit, as the strip 20 has made contact with the contact-piece mounted on the lever 22 which is connected to earth through its support. The motor thus rotates the worm 16 and the worm-wheel 14.

In this manner, the coupling disc 10 rotates with the wheel 14, and the stud 11 makes contact with the arm 12, thus moving the spring plate 8 in the direction of the arrow $f^1$. The boss 24 acts upon the rod 25, thus applying the brakes.

In the meantime, the two electric contact-pieces whereof one, 20, is mounted on the lever 3 and the other, 22, on the spring plate 8, are rotated, but at different speeds since the speed of lever 3 depends upon the speed that the operator moves pedal 2 while plate 8 is operated by motor 18. The circuit of the electric motor 18 being closed by lever 3 when the latter is rotated; the second contact-piece 22 starts after contact-piece 20. After a rotation through a certain angle, which is determined by the distance that the operator chooses to move pedal 2, the contact is broken at the switch, and the motor stops. The worm-wheel 14 is held fast, since the worm is not reversible. The coupling device is applied against the wheel 14, and the braking pressure, which depends upon the degree of flattening of the spring 7 and upon the friction of the facing 13, remains constant if the controlling pedal or lever 2 remains in position. During the whole of the braking period, the motor 18 will thus be stopped, and no current is consumed.

By again displacing the pedal or lever 2 in the braking direction, the lever 3 will again move in the direction of the arrow $f^1$, thus increasing the pressure on the coupling device, and the motor 18 is temporarily set running and thus, by means of the worm-wheel 14, the disc 10 and the spring plate 8, the brakes are further tightened.

Each position of the pedal or lever 2 thus corresponds to a determined degree of the braking, this being proportional to the force of the coupling device, that is, to the flattening of the spring 7 and finally, to the position of the pedal or lever 2.

When the pedal (or brake) is brought into the idle position, the lever 3 is moved to the rear in the contrary direction to the arrow $f^1$, thus separating the contact-pieces 20 and 22, and the spring 7 expands to its normal state. At this time, the braking stress is eliminated, and the usual reaction springs of the brake shoe now bring back the rod-and-link gear 25.

Should the electric action be put out of use on account of damage, the driver may continue to apply the brakes, and he thus operates the axle 23 by means of the arm 21 which forms part of the disc 4 and is hence connected with the lever 3, without moving the coupling disc 10, due to the set of balls 9. It is evident that the braking effort will now be greater in order to apply the brakes to the same extent.

Figs. 2 to 4 show a practical embodiment of the invention. The whole apparatus is contained in a casing 40 provided with an end-plate 41. An axle 51 is secured to the casing, and it carries at one end, upon a grooved part 26, a sleeve 27 having an external thread; said sleeve is secured to the axle and is hence not movable, it being held in place by a nut 28.

A lever 52 which is connected with the brake pedal, not shown, is secured to a disc 53 having the same thread as the sleeve 27, and thus the lever 52 can be rotated on the axle 51 while it is given a longitudinal forward movement. A thrust ball-bearing 29 is mounted on the disc 4. Against said ball-bearing is pressed, by a spring 54, a spring plate 30. At its other end, the spring is in contact with a second spring plate 31 which imparts the stress to the inner member 55 of a one-way clutch (Figs. 2 and 4).

Upon the said member 55 a plate 33 is held, by a nut 32, against longitudinal movement with respect to the axle 51. At the periphery of said plate is formed a clutch cone 56 and said plate has a cylindrical hub 34 adapted to contain the one-way clutch. Balls 57 of the one-way clutch are enegaged by spring-operated plungers 58, by the internal surface of hub 34 and by an annular member 59 surrounding member 55 and connected therewith by means of flutes 60. Annular member 59 is longitudinally held in position on member 55 against a shoulder 61 of the latter by a nut 62. The arrangement is such that the cone 56 will rotate (but without reciprocal action) member 59 and consequently member 55 in the direction of the arrow $f^1$ (which is the direction of rotation of the lever 3 and disc 4 under the action of the controlling pedal).

On the other hand, member 55 is slidably mounted, along the axle 5 on a sleeve 63 integral with a disc 64 centered by a ball-bearing 35 upon the axle 51 and carrying a female cone 65. This latter comprises an external toothed portion engaging a worm 70. The clutch cone 56, which carries a facing 66, can thus be operated by female cone 65, when it has been drawn towards the latter by member 55 under the action of spring 54.

The device for automatically controlling the electric motor comprises an arm 67 integral with disc 53 and upon which is adjustably mounted a stop screw 42. A bell-crank lever 36—37 is pivoted on member 55 of the one-way clutch and arm 36 of said lever is hold in contact with stop screw 42 by means of a spring 38 attached at one end to member 55 and at the opposite end to the other arm 37 of lever 36, 37, said latter arm carrying a contact piece 68 opposite to which is arranged a second contact piece supported by a spring blade 69. Said spring blade is secured to an insulated metal piece 39, carried by an arm 43 which is secured member 55.

Metal piece 39 is provided with a recess 44 wherein is mounted a contact pin 45 which ends into a sliding contact member 46. A spring 47 is arranged in said recess thus applying said sliding contact member against an insulated conducting plate 48, secured to the end-plate 41 of the casing and connected to a screw terminal 49.

In order to permit of applying the brakes, should the current fail, a screw 50 is adjustably mounted on arm 67 opposite to the pivot of lever 36—37, whereby said arm 67 is adapted to come into contact with said pivot, when disc 53 is rotated, thus rotating member 55 manually.

The operation of the apparatus is the same as above indicated. In the inoperative position, spring 54 is not compressed between disc 53 and member 55 or but little compressed, this compression being not sufficient to overcome the frictional resistances of the parts, so that in the inoperative position, facing 66 is not in contact with cone 65. When the driver acts upon the brake control lever or pedal, lever 52 and disc 53 are rotated in the direction of error $f^2$ (Fig. 3). The helical motion of disc 53 causes a longitudinal displacement of member 55 and clutch member 33 and, through member 42 and lever 36—37, the contact between the contact pieces 20 and 22. The motor is thus rotated but does not immediately operate member 55 because facing 66 is not yet pressed against cone 65.

During the beginning of the stroke of the brake control lever or pedal, member 50 engages the pivot of lever 36—37 and member 55 is thus rotated manually in order to perform the inoperative stroke of the brake gear. The device is so adjusted that, as soon as the brake engages the brake drum, facing 66 is pressed against cone 65 and member 55 is thus rotated in the direction of arrow $f^3$ (Fig. 3). The brakes are thus applied and the operation goes on as above explained for the device shown in Fig. 1. If the current fails, disc 53 will still rotate member 55, through stop screw 50 and will thus apply the brakes. Although the coupling disc 56 is applied against cone 65 the operation above explained is made possible due to the provision of the one-way clutch.

The return of the brakes and of the parts of the servo-brakes to the idle position is effected in the same manner as above indicated for the apparatus of Fig. 1.

Obviously, the said invention is not limited to the forms of construction herein described and represented, which are given merely by way of example.

Having now particularly described and ascertained the nature of my said invention and in what manner the same is to be performed, I declare that what I claim is:

1. A servo-brake comprising in combination an electric motor, a brake actuating member, a friction clutch between said member and said motor, a control lever, a clutch actuating member connected to said lever, a stationary spindle whereon said clutch actuating member is helically movable and whereon the movable part of said friction clutch is loosely mounted, elastic means and antifriction means interposed between said clutch actuating member and said clutch part and a switch for said motor, one contact thereof being connected with said lever and the other with said brake actuating member.

2. In a servo-brake, a brake control member, a prime mover, a brake actuating member, a friction clutch between said prime mover and said brake actuating member, a clutch actuating member connected with said brake control member, a one-way connection between said friction clutch and said brake actuating member, a one-way connection between said brake control member and said brake actuating member, whereby said brake actuating member may be operated by said control member independently of said prime mover, and means responsive to relative movements between said brake control member and said brake actuating member for controlling said prime mover.

3. In a servo-brake, a brake control member, a prime mover, a brake actuating member, a friction clutch between said prime mover and said brake actuating member, a one-way clutch between said brake actuating member and said friction clutch, a clutch actuating member, coaxial with said friction clutch, a one-way connection between said clutch actuating member and said brake actuating member, a stationary member, means for guiding said clutch actuating member in a helical path upon said stationary member, whereby said clutch actuating member has an axial component motion for operating said clutch and a circular component motion, and means responsive to relative circular movement between said clutch actuating member and said brake actuating member for controlling said prime mover.

4. In a servo-brake, a brake control member, a prime mover, a brake actuating member, a friction clutch between said prime mover and said brake actuating member, a clutch actuating member connected with said brake control member, resilient means between said friction clutch and said clutch actuating member, and means responsive to relative movements between said brake control member and said brake actuating member for controlling said prime mover.

MARIUS JEAN-BAPTISTE BARBAROU.